(No Model.)

J. R. LITTLE.
METAL WHEEL.

No. 470,941.    Patented Mar. 15, 1892.

Witnesses:
Jas. E. Hutchinson.
Henry C. Hazard.

Inventor.
James R. Little, by
Crindle and Russell, his Attys.

UNITED STATES PATENT OFFICE.

JAMES R. LITTLE, OF QUINCY, ILLINOIS.

METAL WHEEL.

SPECIFICATION forming part of Letters Patent No. 470,941, dated March 15, 1892.

Application filed June 16, 1891. Serial No. 396,511. (No model.)

*To all whom it may concern:*

Be it known that I, JAMES R. LITTLE, of Quincy, in the county of Adams, and in the State of Illinois, have invented certain new and useful Improvements in Metal Wheels; and I do hereby declare that the following is a full, clear, and exact description thereof, reference being had to the accompanying drawings, in which—

Figure 1:
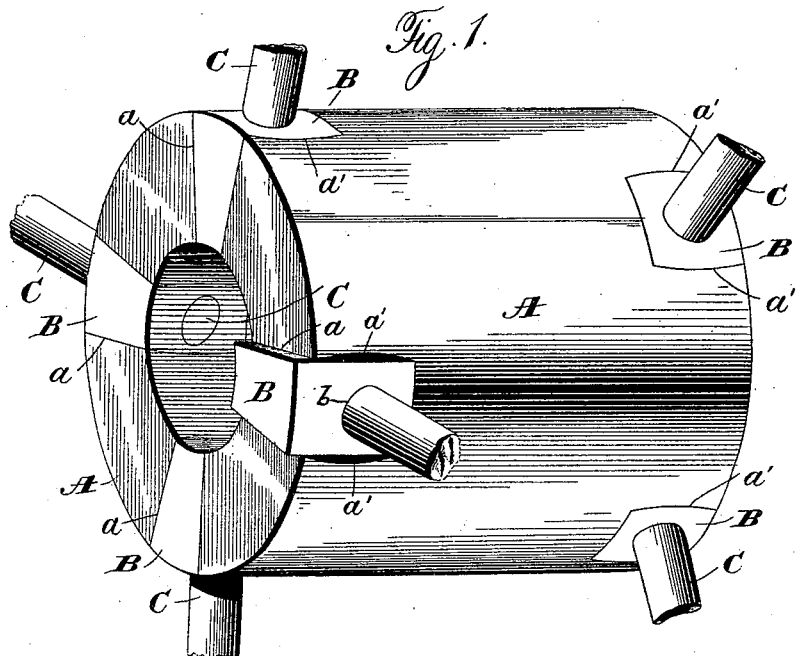
Figure 2:
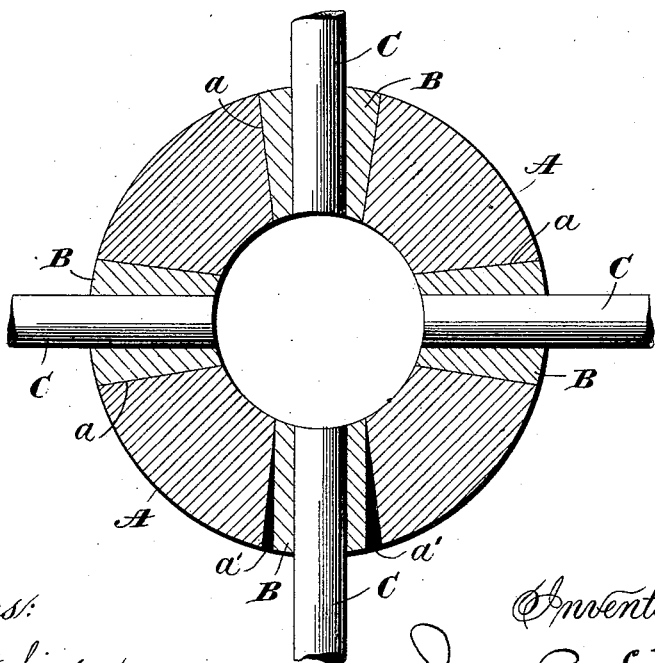

Figure 1 is a perspective view of a hub and spokes united therewith in accordance with my invention; and Fig. 2, a section on a line passing through the hub-axis, showing in the case of one spoke the relative shapes and positions of parts before the union of the spoke is accomplished.

Letters of like name and kind refer to like parts in each of the figures.

The design of my invention is to construct a metal wheel adapted particularly for use as a pulley for power-transmitting purposes, whose hub and spokes shall be most strongly and rigidly united; and to this end said invention consists in the construction and arrangement of parts, as hereinafter specified.

My invention involves an application of the idea of uniting a hub and spokes by the compression upon the latter of the inclosing portion of the hub, as set forth in my application, Serial No. 393,208, filed May 18, 1891. In the latter, as illustrating the method which constitutes its subject-matter, I describe a hub composed entirely of malleable iron, provided with openings or mortises for the reception of spokes, which are secured to the hub by compressing the inclosing metal upon them. The present invention, however, has in view the use of a cast-iron hub to which the spokes shall be secured in the manner above indicated, and this I accomplish by the means now to be described.

Referring to the drawings, A designates a cast-iron hub having formed in each end a series of radial recesses or cavities $a$ larger than the diameter of a spoke end. Said recesses may have the shape shown or any other desired shape in plan view; but whatever their general shape may be they should between their inner and outer ends be widened or increased in size in a circumferential direction. This latter in the present instance is done by making the two opposite radial walls $a'$ and $a'$ concave or swelled outwardly. To the hub thus constructed I attach the spokes in the following manner, viz: In each recess or cavity $a$ I place a plane or approximately plane sided block B of malleable iron, whose dimensions are such with reference to the shape and size of the cavity as to enable it to be readily put therein and when so situated to project a short distance beyond the end face of the hub. Then with a spoke C placed in a longitudinal opening $b$ in the block said block is subjected on the projecting portion to such pressure in a line parallel with the direction of the hub-axis as will compress it in such direction and cause it to expand laterally to fill and tightly fit said cavity and at the same time be compressed around and upon the contained portion of the spoke C and form therewith a tight and secure joint possessing all needful strength and rigidity. The increase or widening of the recesses or cavities internally, as above described, accommodates or provides room for the blocks as they expand laterally in consequence of their compression and insures the secure retention of said blocks in the cavities when expanded therein.

The wheel-rim may be attached to the spokes in any desired way.

While I design that the manner of uniting the hub and spokes as covered by this specification shall be employed in the manufacture of wheels for use especially as pulleys, it is to be understood that I do not limit myself to any such special use, as wheels thus made may be used for other purposes.

Having thus described my invention, what I claim is—

1. As an improvement in wheels, a metal hub having spoke-attaching sections of different nature from the hub compressed upon inclosed portions of the spokes, substantially as and for the purpose specified.

2. As an improvement in wheels, a cast-metal hub having spoke-attaching sections of different nature from the hub secured to the latter by being expanded in recesses therein and compressed upon inclosed portions of the spokes to secure such spokes therein, substantially as and for the purpose set forth.

3. As an improvement in wheels, a cast-metal hub having radial recesses, the spoke-attaching sections or blocks expanded into said recesses and compressed upon inclosed portions of the spokes, substantially as and for the purpose shown.

4. As an improvement in wheels, a cast-metal hub having internally-enlarged recesses and spoke-attaching sections or blocks expanded into said recesses and compressed upon inclosed portions of the spokes, substantially as and for the purpose described.

In testimony that I claim the foregoing I have hereunto set my hand this 26th day of May, 1891.

JAMES R. LITTLE.

Witnesses:
  S. M. WALLACE,
  S. DEIDESHEIMER.